US012186646B2

(12) United States Patent
Ecker

(10) Patent No.: US 12,186,646 B2
(45) Date of Patent: Jan. 7, 2025

(54) SCORECARD HOLDER, AND METHOD OF MAKING AND USING SAME

(71) Applicant: Michael D. Ecker, Ambler, PA (US)

(72) Inventor: Michael D. Ecker, Ambler, PA (US)

( * ) Notice: Subject to any disclaimer, the term of this patent is extended or adjusted under 35 U.S.C. 154(b) by 0 days.

(21) Appl. No.: 18/664,504

(22) Filed: May 15, 2024

(65) Prior Publication Data

US 2024/0390768 A1 Nov. 28, 2024

Related U.S. Application Data

(60) Provisional application No. 63/504,215, filed on May 25, 2023.

(51) Int. Cl.
*B42D 3/02* (2006.01)
*A63B 71/06* (2006.01)

(52) U.S. Cl.
CPC ............ *A63B 71/0672* (2013.01); *B42D 3/02* (2013.01)

(58) Field of Classification Search
CPC ........................................................ B42D 3/02
USPC ..... 40/124.01, 124.06; 281/15.1, 29, 30, 31, 281/44, 51; 283/48.1, 49, 50, 52.1, 67, 283/72
See application file for complete search history.

(56) References Cited

U.S. PATENT DOCUMENTS

| | | | | |
|---|---|---|---|---|
| 2002/0029833 A1* | 3/2002 | Valunas | A45C 11/18 | 150/147 |
| 2007/0012737 A1* | 1/2007 | Boccagna | A63B 57/20 | 224/230 |
| 2015/0305455 A1* | 10/2015 | Abbott | A45C 1/06 | 150/137 |

* cited by examiner

*Primary Examiner* — Justin V Lewis
(74) *Attorney, Agent, or Firm* — Mark T Vogelbacker; Eckert Seamans Cherin & Mellott, LLC

(57) ABSTRACT

A scorecard holder can include an outer jacket foldable about a seam, binding, or hinge. The outer jacket can be movable between a closed position and an open position. In the open position the holder can at least expose at least a portion of the scorecard. The outer jacket can include an interior surface and an opposing exterior surface. At least a portion of the interior surface can be configured to contact the scorecard placed within the outer jacket. When in the open position an outer periphery of the outer jacket can be at least slightly larger than the outer periphery of the scorecard configured to be held within the outer jacket. The scorecard holder can include a flexible shield attached to either i) a top edge of the outer jacket or ii) the seam, binding, or hinge.

7 Claims, 9 Drawing Sheets

SCORECARD HOLDER, AND METHOD OF MAKING AND USING SAME

CROSS-REFERENCE TO RELATED APPLICATION

The present application claims priority to U.S. Provisional Application No. 63/504,215, filed May 25, 2023, and titled "SCORECARD HOLDER, AND METHOD OF MAKING AND USING SAME", the disclosure of which is hereby incorporated by reference in its entirety.

FIELD

The presently disclosed technology relates generally to sporting events and/or athletics. More particularly, in one embodiment, the presently disclosed technology relates to a system or method to assist a user to keep track of a sporting event or athletic competition (e.g., a golf match or baseball game) in inclement or undesirable weather.

BACKGROUND AND DESCRIPTION OF RELATED ART

Watching or participating in an athletic or sporting event in inclement or undesirable weather often makes the activity less enjoyable. For example, it can be challenging to keep track of your or another's golf score when it is raining. Golfers go to great lengths to prevent the scorecard from becoming wet, but are often unsuccessful at doing so.

One example of prior art golf scorecard holder, generally designed 10, is shown in FIG. 1. The holder 10 includes an outer jacket 12 having an interior surface 14 and an opposing exterior surface (not shown). The outer jacket 12 is movable between an open position (see FIG. 1) in which a scorecard 16 is exposed and a closed position (not shown) in which the outer jacket 12 is folded about a binding 18. One or two elastic straps 20, which can extend parallel to and spaced-apart from the binding 18, can extend across the interior surface 14 of the outer jacket 12 to help hold the scorecard 16 in a desired position.

Other examples of prior art golf scorecard holders as shown in FIGS. 2-4. These holders 10 can include an elastic band 22 that forms a passageway to receive a writing implement 23 (see FIG. 2), a metal clip 24 to help hold the scorecard 16 in a desired position (see FIG. 3), and corner pockets 26 and/or a side slot 28 designed to receive at least a portion of the scorecard 16 therein to help hold the scorecard 16 in a desired position (see FIG. 3)

When each of the above-described holders 10 is in the closed position, the scorecard 16 stays somewhat dry during a rainstorm. However, when the user moves the holder from the closed position to the open position to expose the scorecard 16 to either read the scores or write down a new score, the scorecard 16 is often exposed to the rain and can become quickly drenched. This renders the scorecard almost useless.

An umbrella is only somewhat helpful in keeping the scorecard dry, especially while the user is attempting to write on the scorecard while simultaneously holding the umbrella. Further, a golf cart is only somewhat helpful in keeping the score card dry. Even with a front windshield and a roof, rain can still be blown into the interior of the golf cart, thereby potentially getting the scorecard wet. Once the scorecard is wet, it can be difficult to write on or see numbers or notes written on the scorecard.

Another prior art attempt to keep a golf scorecard dry in the rain is to place the scorecard in a clear, plastic sandwich bag. This method may work well when the sandwich bag is closed and the scorecard is completely surrounded. But this method requires that the scorecard be at least partially removed from the bag to write the score or notes, thereby exposing the scorecard to the elements.

Similarly, as a coach or sitting in the stands of a baseball game, for example, it can be difficult to keep score with a pencil and paper during the rain.

BRIEF SUMMARY

There is a need to create a device and method that allows a spectator or athlete to easily keep track of details of the event, even while it is raining or during other inclement weather. There is a need to provide a simple and cost-effective solution for keeping scorecard and other papers and writing medium dry, while allowing a user to easily write on and see the contents thereof even during inclement weather. The above and other needs are addressed by the presently disclosed technology.

In one aspect, the presently disclosed technology is directed to a golf scorecard holder that can include an outer jacket or cover foldable about a seam, binding, or hinge. The outer jacket can be movable between a closed position and an open position. In the closed position the holder can surround the golf scorecard. In the open position the holder can at least expose at least a portion of the golf scorecard. The outer jacket can include an interior surface and an opposing exterior surface. At least a portion of the interior surface can be configured to contact the golf scorecard placed within the outer jacket. When in the open position an outer periphery of the outer jacket can be at least slightly larger than the outer periphery of the scorecard configured to be held within the outer jacket. The golf scorecard holder can include a flexible shield attached to either i) a top edge of the outer jacket or ii) the seam, binding, or hinge. The shield can be at least partially transparent or translucent. The shield can be moveable between a closed position and an open position. In the closed position the shield can be configured to contact the golf scorecard or the interior surface of the outer jacket. In the open position the shield can be movable to allow a user to access and write on the golf scorecard.

In another aspect, the presently disclosed technology is directed to a method of preventing a scorecard from getting wet during a round of golf, or during a baseball or softball game, for example. The method can include attaching a flexible shield to either i) a top edge of an outer jacket that is foldable about a scam, binding, or hinge or ii) the seam, binding, or hinge of the outer jacket.

Optionally, in one embodiment, the presently disclosed technology is directed to a rigid book-shaped item that folds in the middle to hold a golf scorecard securely in place protected by a plastic shield attached to the top edge of the holder for use during a round of golf played in the rain. The holder can have rigid plastic flaps at each corner and/or at an upper end thereof to hold the scorecard in place. The flaps can be open on the sides to accommodate scorecards that are wider than the holder. The plastic rain shield could be attached across the top of the holder and creased in the middle to allow it to fold and conform to the shape of the holder (and scorecard) and to be lifted to record scores while protecting the scorecard from the rain. Optionally, a metal clip could be attached to the bottom to secure the plastic rain shield, and released to allow the rain shield to be lifted.

Optionally, the holder can include a seam, binding or hinge that allows or promotes the holder to be opened in a lateral and/or horizontal configuration. Optionally, the holder can include a seam, binding or hinge that allows or promotes the holder to be opened in a vertical configuration. In either case, the holder can include an interior shield, protector, or cover.

In one optional embodiment, the presently disclosed technology can be thin enough to fit in a user's back pant or short pocket comfortably, but substantial enough to record scores easily, with an almost invisible plastic shield to protect the scorecard in the rain and plastic flaps on top for use on dry days. For righties and lefties, there is a pencil holder on both the right and left side.

BRIEF DESCRIPTION OF THE DRAWINGS

The foregoing summary, as well as the following detailed description of the presently disclosed technology, will be better understood when read in conjunction with the appended drawings, wherein like numerals designate like elements throughout. For the purpose of illustrating the presently disclosed technology, there are shown in the drawings various illustrative embodiments. It should be understood, however, that the presently disclosed technology is not limited to the precise arrangements and instrumentalities shown.

In the drawings.

DETAILED DESCRIPTION

Figure 1:
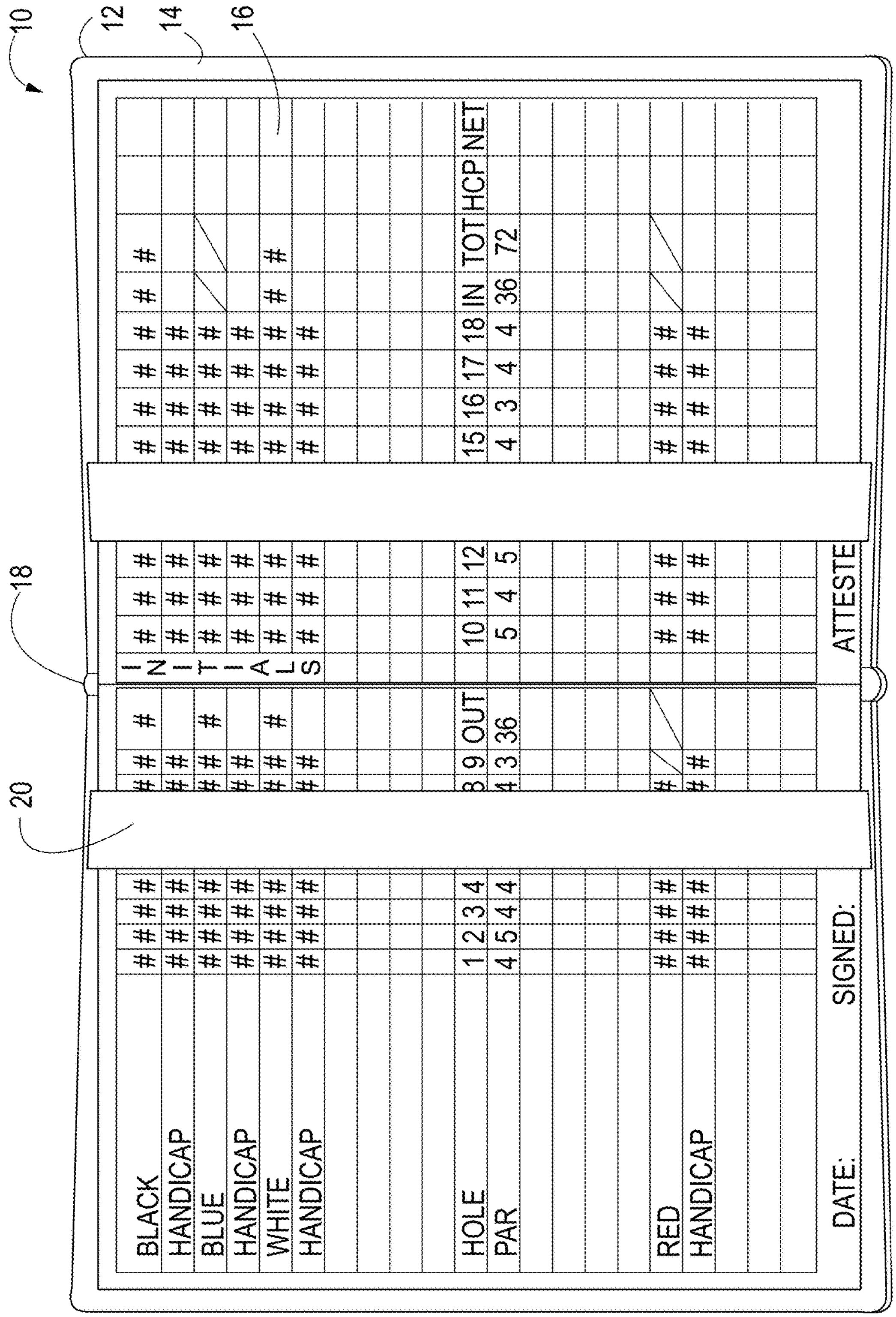
FIG. 1 (Prior Art)
FIG. 1 is a top plan view of a scorecard holder of the prior art, where the holder is shown in an open position and a golf scorecard is secured therein.
Figure 2:
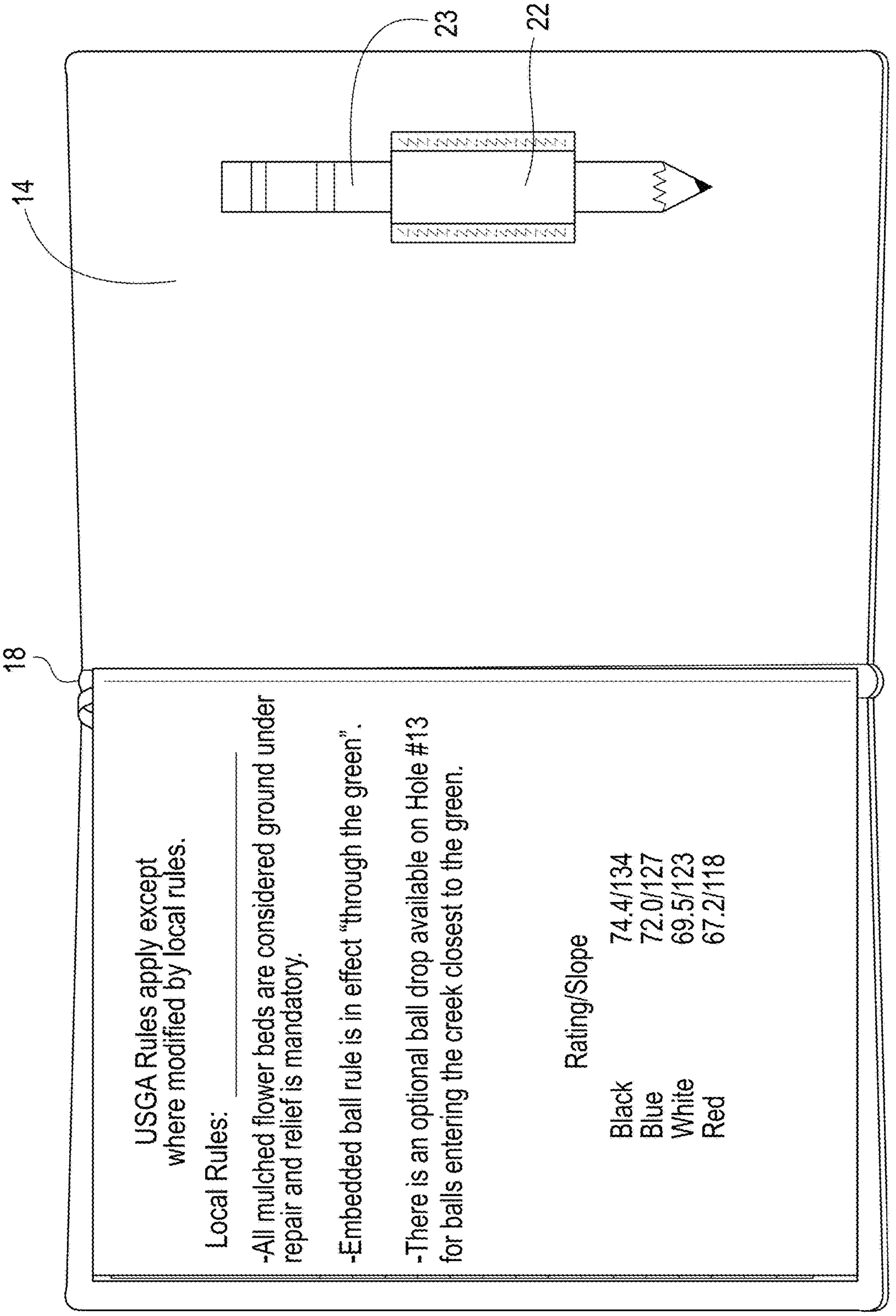
FIG. 2 (Prior Art)
FIG. 2 is a top plan view of another golf scorecard holder of the prior art, where the holder is shown in an open position and a golf scorecard and a writing implement is secured therein.
Figure 3:
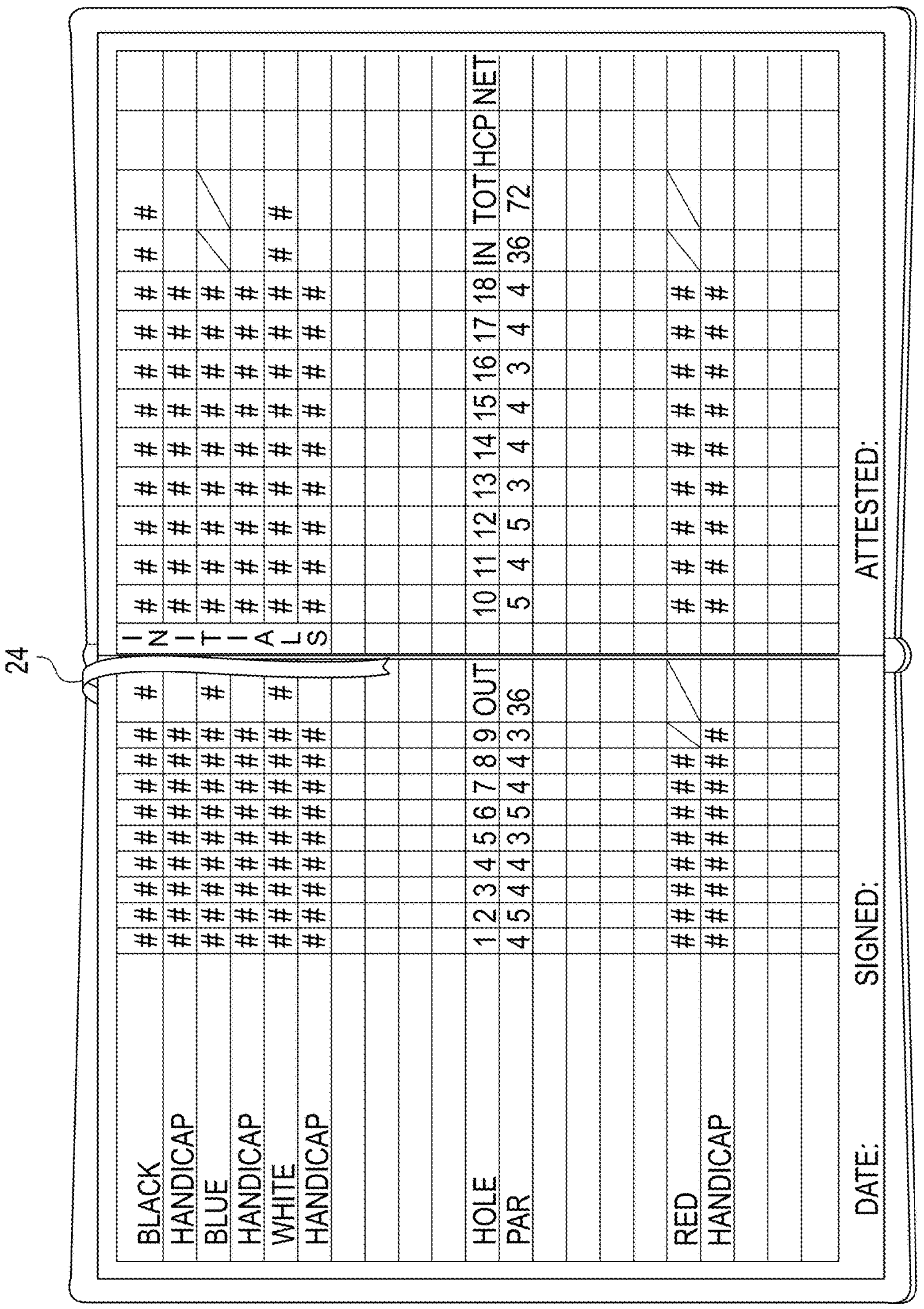
FIG. 3 (Prior Art)
FIG. 3 is a top plan view of yet another golf scorecard holder of the prior art, where the holder is shown in an open position and a golf scorecard is secured therein.
Figure 4:
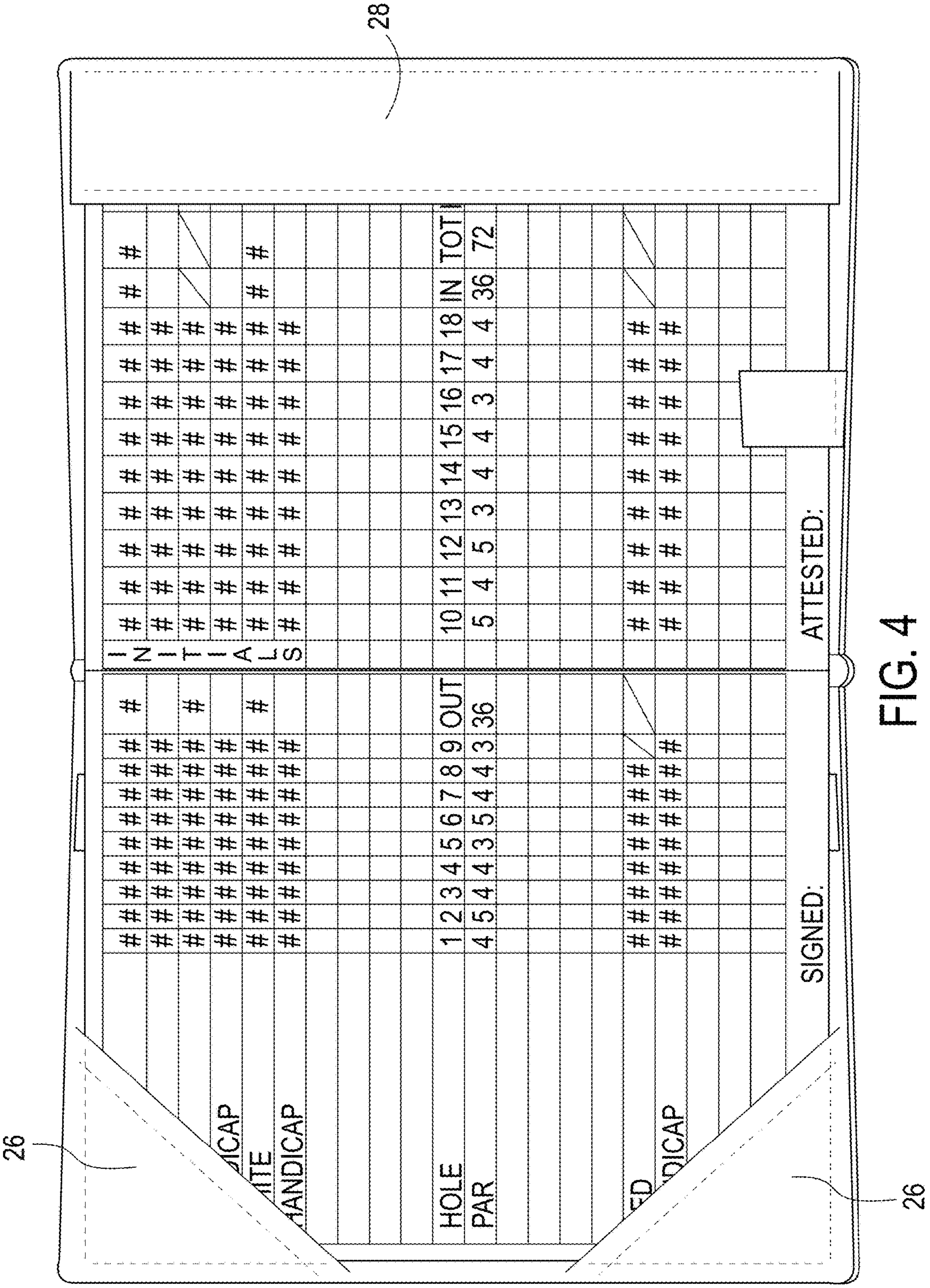
FIG. 4 (Prior Art)
FIG. 4 is a top plan view of still a further golf scorecard holder of the prior art, where the holder is shown in an open position and a golf scorecard is secured therein.
Figure 5:
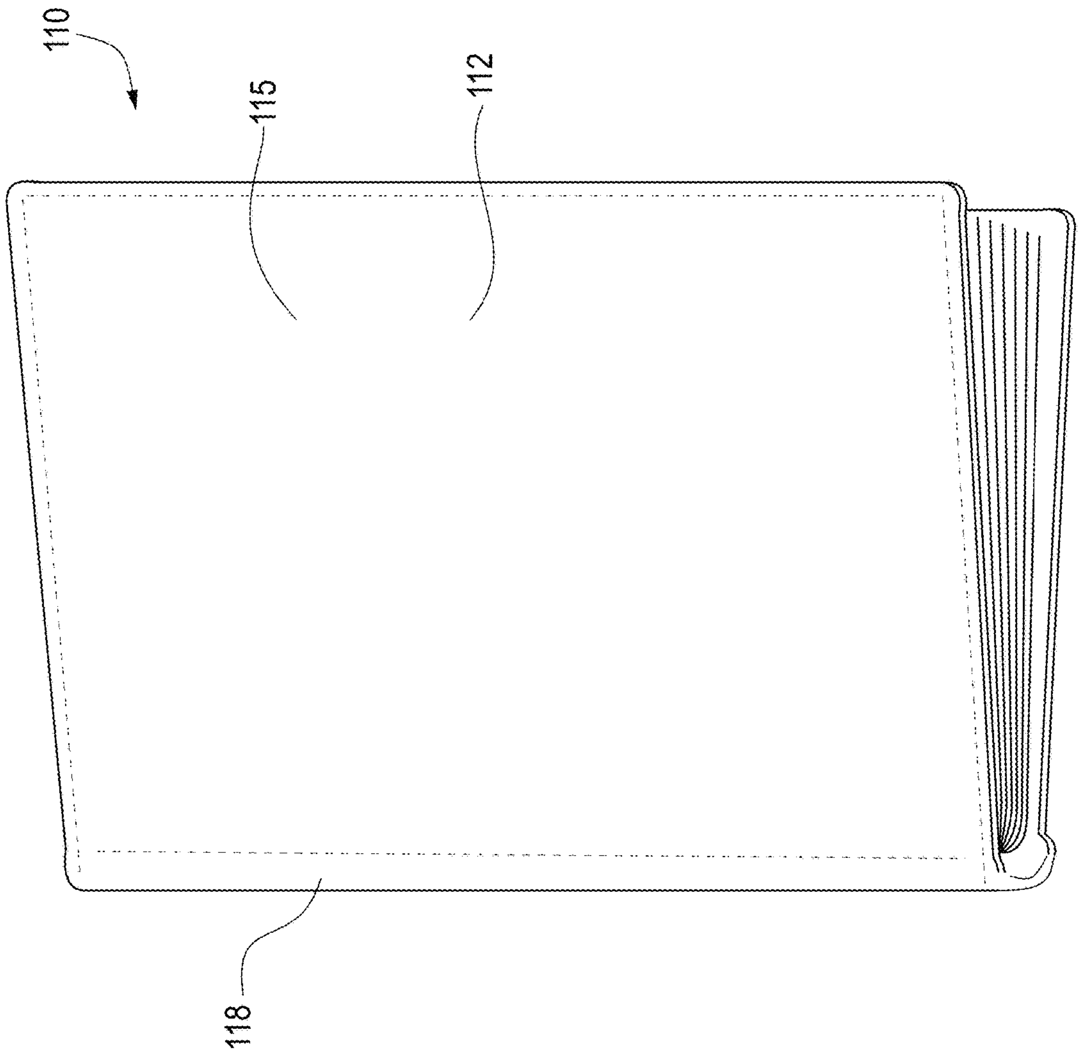
FIG. 5 is a top plan view of a scorecard holder of an embodiment of the presently disclosed technology, where the holder is shown in a first or closed position.

While systems, devices and methods are described herein by way of examples and embodiments, those skilled in the art recognize that the presently disclosed technology is not limited to the embodiments or drawings described. Rather, the presently disclosed technology covers all modifications, equivalents and alternatives falling within the spirit and scope of the appended claims. Features of any one embodiment disclosed herein can be omitted or incorporated into another embodiment.

Any headings used herein are for organizational purposes only and are not meant to limit the scope of the description or the claims. As used herein, the word "may" is used in a permissive sense (i.e., meaning having the potential to) rather than the mandatory sense (i.e., meaning must). Unless specifically set forth herein, the terms "a," "an" and "the" are not limited to one element but instead should be read as meaning "at least one." The terminology includes the words noted above, derivatives thereof and words of similar import.

Referring now in detail to the various figures, wherein like reference numerals refer to like parts throughout, FIGS. 5-9 illustrate a holder, generally designated 110, according to optional embodiments of the presently disclosed technology. The holder 110 can be configured to hold and/or protect a scorecard 116 (see FIGS. 8 and 9), while allowing easy access to the scorecard 116 to write or make notations thereon. Although one use of the holder 110 herein relates to golf, the holder 110 can be used for scorecards 116 used for other sporting events or activities, such as baseball, softball, or beach volleyball.

In one embodiment, the holder 110 can include an outer jacket or cover 112 that is foldable about a seam, binding, or hinge 118. Optionally, the seam 118 can be positioned in or at a lateral center of the cover 112, thereby dividing the cover 112 into two equal halves. The outer jacket 112 can be movable between a first or closed position (see FIG. 5) and a second or open position (see FIGS. 6-9). In the closed position, the holder 110 can be configured to cover, surround, and/or hold the scorecard 116. In the open position, the holder 116 can be configured to expose at least a portion (e.g., a front side) of the scorecard 116, while protecting or covering another portion (e.g., a back side) of the scorecard 116.

Optionally, the outer jacket 112 can include an interior surface 114 and an opposing exterior surface 115. At least a portion of the interior surface 114 can be configured to contact the scorecard 116 (e.g., a back surface thereof) placed within the outer jacket 112. The exterior surface 115 can protect the scorecard 116 whether the holder 110 is in the first or second position.

Referring to FIGS. 6-9, in one optional embodiment, the holder 112 can include at least one shield 130. Optionally, the shield 130 is flexible and/or at least partially or completely transparent or translucent, while the outer jacket 112 may be formed so that it cannot be seen through. In one embodiment, the shield 130 includes a pre-formed crease or fold 131 (see FIGS. 7 and 9), which can extend parallel to the seam, binding, or hinge 118 and/or be located in the lateral middle of the shield 130. The shield 130 can be configured to protect the scorecard 116 and/or the interior surface 114 of the outer jacker 112 from rain or other elements, while allowing a user to easily and quickly access and/or write on the scorecard 116.

The shield 130 can be moveable between a closed position and an open position. In the closed position (see FIGS. 6 and 8), the shield 130 can be configured to contact the scorecard 116 or the interior surface 114 of the outer jacket 112. In the open position (see FIG. 7), the shield 130 can be flexible and/or movable to allow a user to access and/or write on the scorecard 116 without necessarily exposing the entire scorecard 116 or even a significant portion thereof to the elements. In the closed position, the crease 131 of the shield 130 can extend parallel to each side edge of the outer jacket 112, and perpendicular to the top edge of the outer jacket 112.

In the embodiments shown in FIGS. 6-9, one edge of the shield 130 can be attached to an edge (e.g., a top edge) of the outer jacket 116. In particular, a top edge or top portion can be sewn, glued, heat sealed, or otherwise mechanically and/or chemically attached to a corresponding top edge or top portion of the outer jacket 112 and/or the interior surface 114 of the outer jacket 112. For example, hook-and-loop type fasteners can be used to attach at least a portion of the shield 130 to at least a portion of the outer jacket 112. In addition, the shield 130 can be attached to the outer jacket 116 at other locations, such as a side or bottom edge thereof, if desirable.

Figure 8:
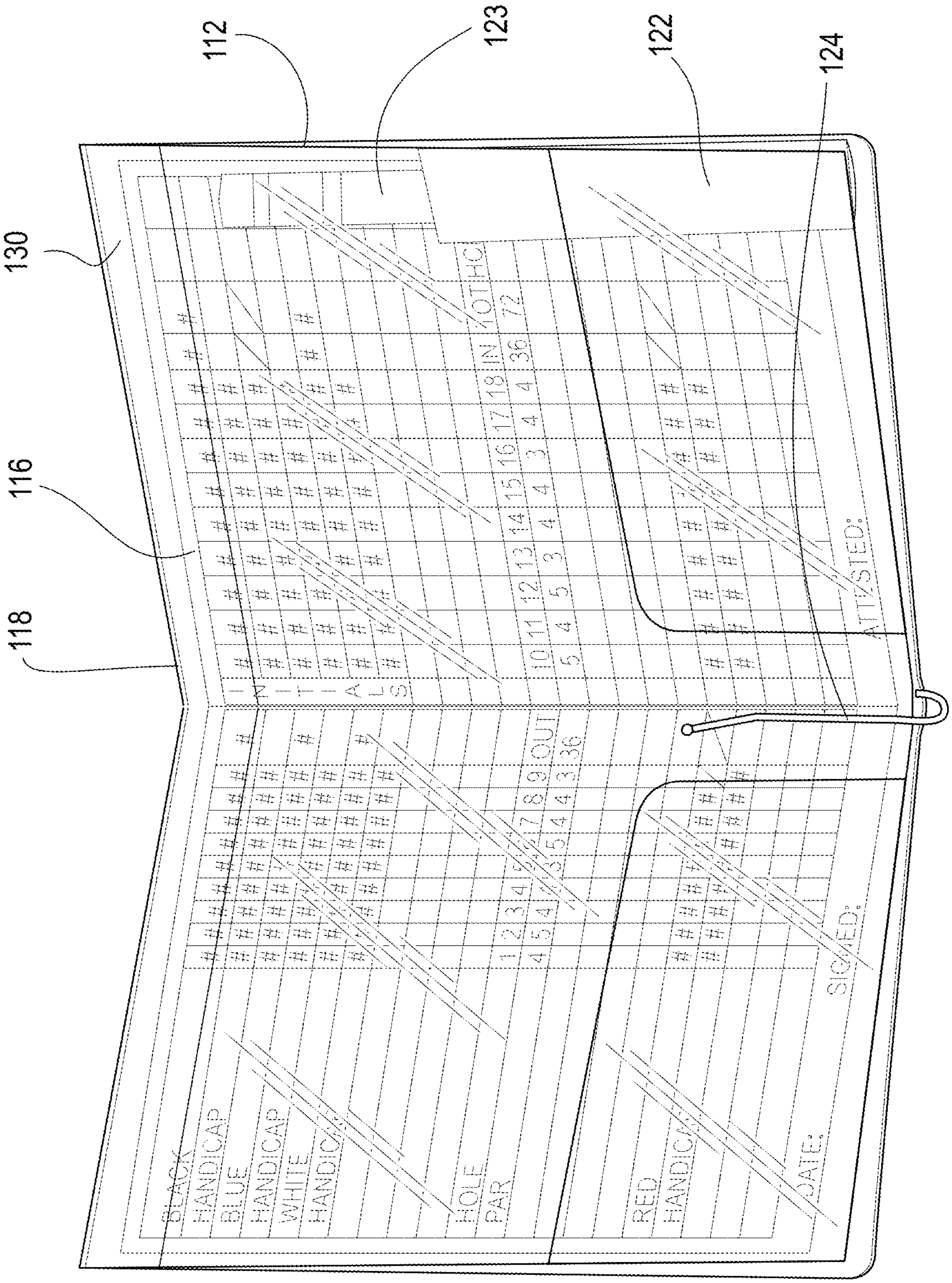
FIG. 8 is a top plan view of an embodiment of the holder shown in FIG. 5, where the holder is shown in the second or open position, a golf scorecard and a writing implement is secured therein, and the shield is held in the first or closed position.
Figure 9:
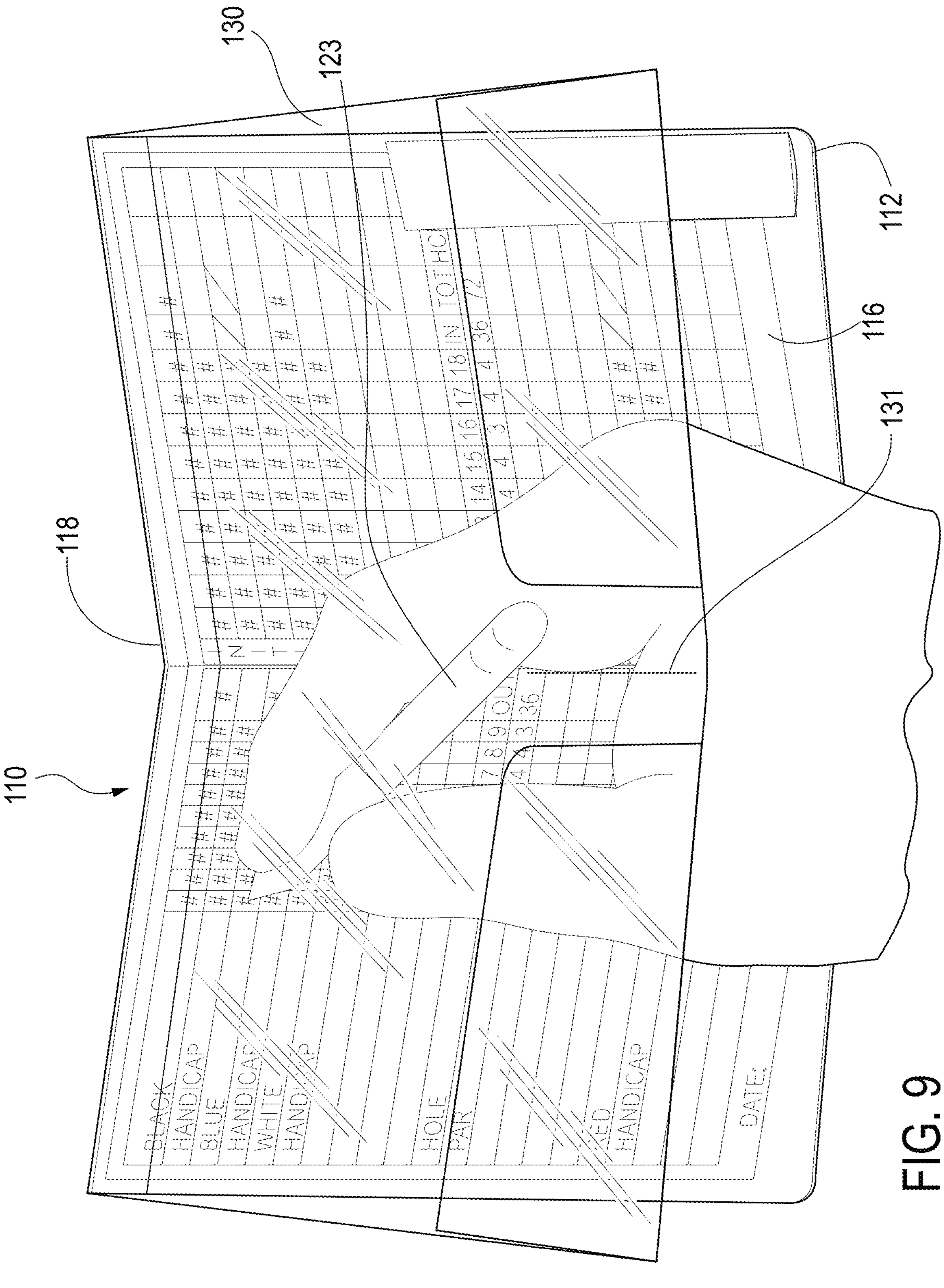
FIG. 9 is a top plan view of the holder shown in FIG. 8, wherein the holder is shown in the second or open position, and the shield is temporarily held between the first and second positions while a user marks the golf scorecard with the writing implement.

As shown in FIGS. 8 and 9, in one embodiment, when in the open position, an outer periphery (e.g., a width and a length) of the outer jacket 112 can be at least slightly larger than the outer periphery of the scorecard 116 configured to be held within the outer jacket 112. More particularly, a width and length of the shield 130 are greater than a width and length of the outer jacket 112, respectively, when the outer jacket 112 is in the open position and the shield 130 is in the closed position.

In an example of one such embodiment, after the outer jacket 116 is unfolded in a lateral manner (e.g., left to right or right to left), a user can grasp the shield 130 by one of the free edges, for example, such as either later edge or the bottom edge thereof, and at least slightly lift the shield to expose at least a portion of the scorecard 116 to allow a top of a writing implement 23 to access the scorecard 116. Optionally, movement of the shield 130 from the closed position to the open position in such an embodiment can be considered perpendicular to movement of the outer jacket 112 from the closed position to the open position, depending upon the precise hand movement by the user and/or the type of outer jacket 112 employed.

In an example of another such embodiment, the outer jacket 112 is not foldable or pre-folded but instead extends in single plane. The shield 130 can be the only object on top of the scorecard 116 and protecting the scorecard 116 from the elements. Such an embodiment can be useful for scorecards 116 that are smaller than what is typical, or of a unique size and/or shape.

Additionally or alternatively, in one embodiment, one edge of the shield 130 can be attached to the seam, binding, or hinge 118 of the holder 110. Optionally, movement of the shield 130 from the closed position to the open position in such an embodiment can be considered parallel to movement of the outer jacket 112 from the closed position to the open position, depending upon the precise hand movement by the user and/or the type of outer jacket 112 employed.

One of several benefits of the presently disclosed technology is that an entirety or a majority of the front face of the scorecard 116 is simultaneously visible and protected from inclement weather (see, e.g., FIG. 8). Conventional methods of protecting a scorecard do not provide for this dual benefit, and can be cumbersome to use, can block portions of the scorecard 116 from view, and/or are ineffective in keeping the scorecard 116 dry. As shown in FIG. 9, another benefit of the presently disclosed technology is that even while a user's hand is writing on the scorecard 116, all or a majority of the scorecard 116 can be kept separate from rain or other elements. Yet another benefit of the presently disclosed technology is that it is simple and cost effective to make or manufacture.

One method of the presently disclosed technology includes attaching, either permanently or temporarily, the shield 130 to either the top edge or top portion of the outer jacket 112 or the seam, binding, or hinge 118.

The method can optionally include unfolding the outer jacket 112 from a closed position to an open position. The method can include lifting one edge or corner of the shield 130 upwardly from a closed position toward an open position to expose at least a portion of the scorecard 116. More particularly, the method can include lifting a bottom edge or one of two bottom corners of the shield 130 upwardly toward the top edge of the outer jacket 112.

In one optional embodiment, the method can include using a writing implement 123 (see FIG. 8), such as a golf pencil that may or may not be removably held in an elastic band 122 on one or either side of the interior surface of the outer jacket 112, to write on the scorecard 116, allowing the shield 130 to move to the closed position, and folding the outer jacket 112 from the open position to the closed position. Optionally, a metal clip 124 can be used to help hold the scorecard 16 in a desired position (see FIG. 8), either above or beneath the shield 130.

Referring again to FIGS. 6 and 7, in one optional embodiment, the at least one shield 130 includes a single inner shield 130 and at least one or two spaced-apart outer shields 133. Optionally, the inner shield 130 can be positioned between either or both of the outer shields 133 and an interior surface of the outer jacket 112.

Figure 6:
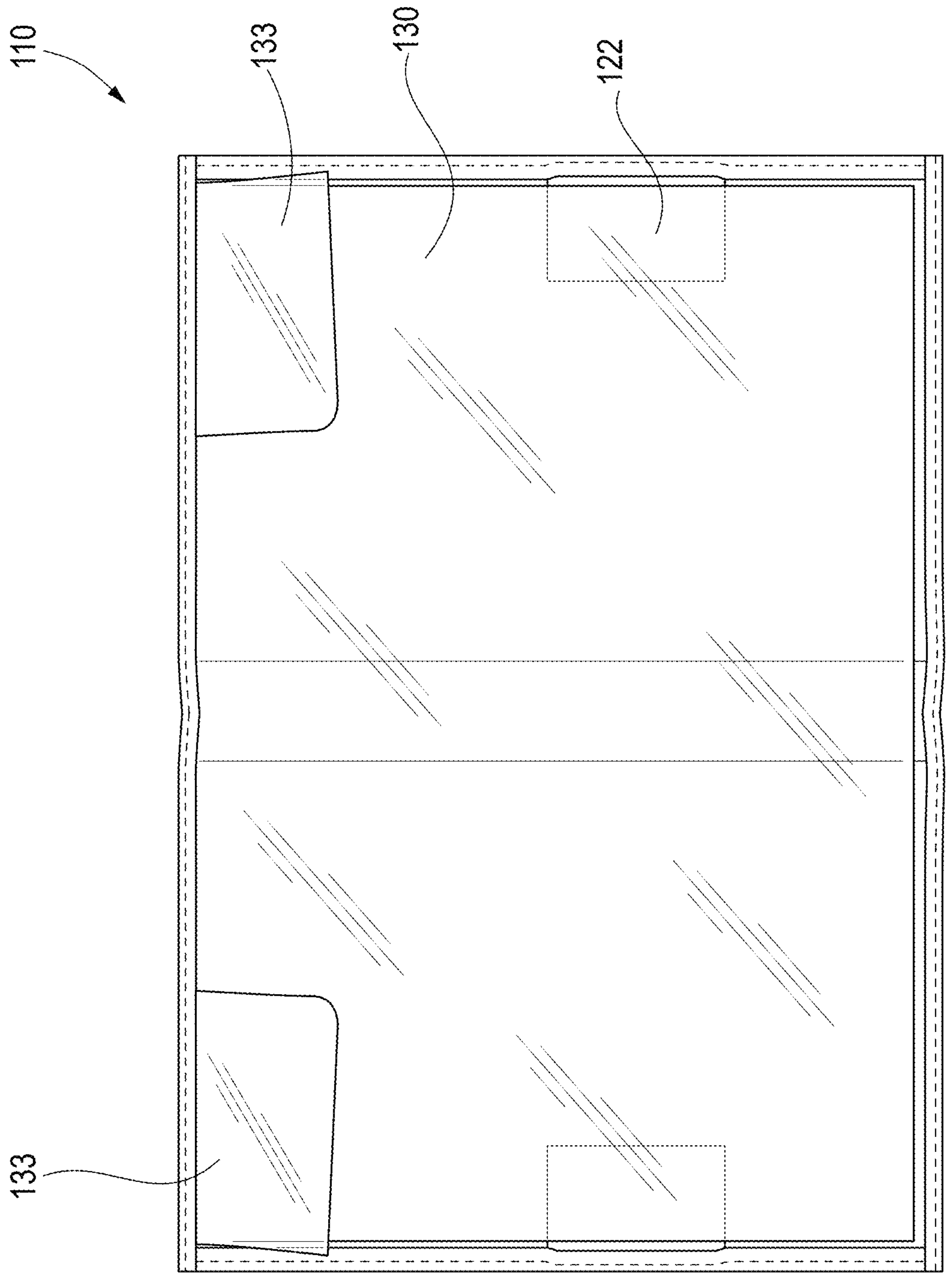
FIG. 6 is a top plan view of an embodiment of the holder shown in FIG. 5, where the holder is shown in a second or open position and a shield is shown in a first or closed position.
Figure 7:
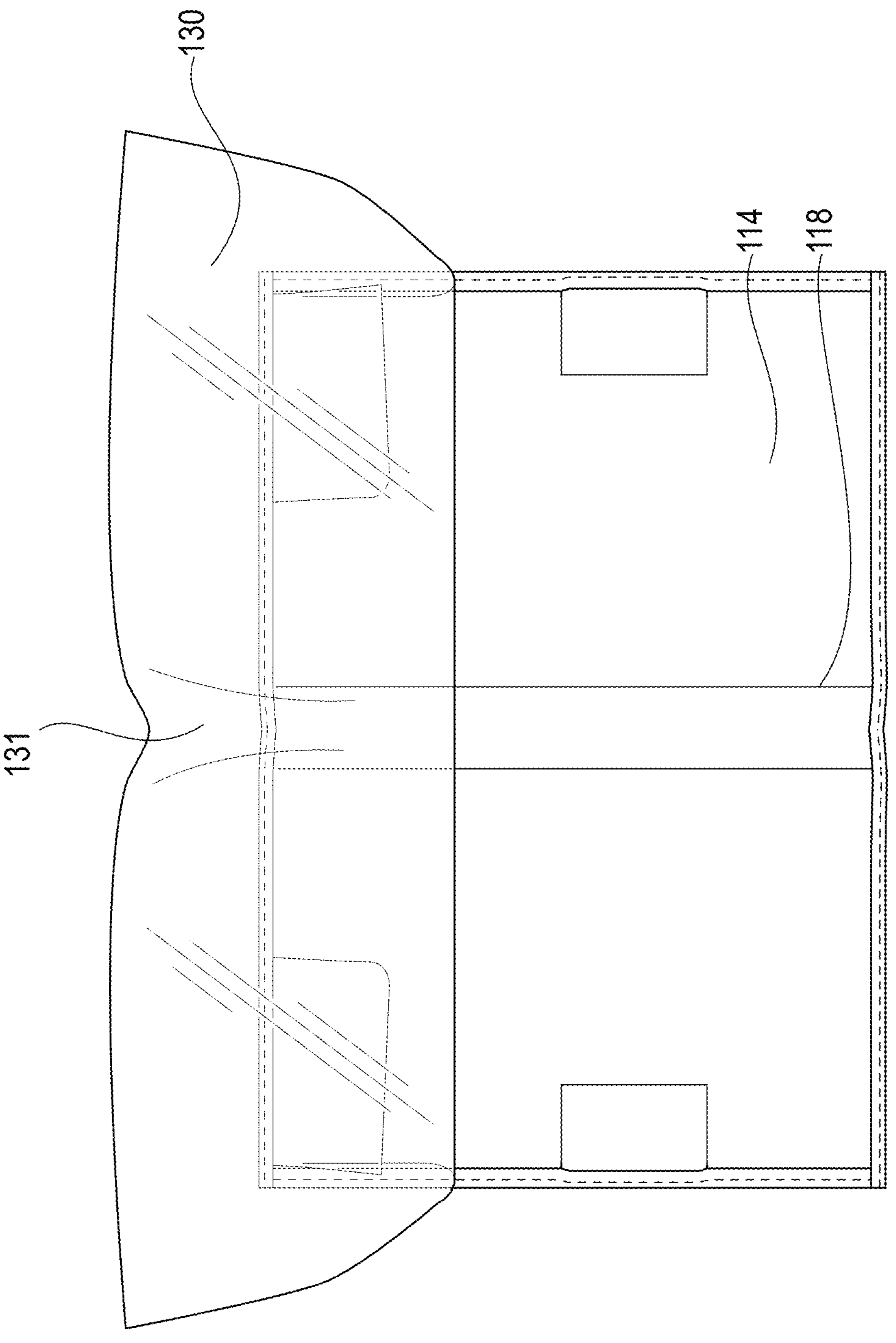
FIG. 7 is a top plan view of the holder shown in FIG. 6, where the holder is shown in the second or open position and the shield is shown in a second or open position.

The inner shield 130 can be significantly larger than each or even the combined outer shields 133. For example, as shown in FIG. 6, each outer shield 133 may be located at one upper edge or corner of the inner shield 130, and extend less than a fourth of the way down the inner shield 130 and less than halfway across the inner shield 130. The outer shields 133 can be made from the same material as the inner shield 130.

One or both of the outer shields 133 can be used to hold the scorecard 116 in place without obstructing the writing or text surface of the scorecard, or at least without preventing a user from writing on the scorecard 116. The scorecard 116 can be placed under one or both of the outer shields 133 and on top of the inner shield 130 during nice or non-rainy weather. This way, the scorecard 116 can be held in place and easily accessed without the user needing to move the outer shield 130. When the weather is rainy or wet, the scorecard 116 can be placed under both the outer shields 133 and the inner shield 130 to keep the scorecard 116 dry. The outer shields 133 can be attached to the interior surface of the outer jacket 112 in the same manner as the inner shield 130.

Any features described in the Background section above or shown in FIGS. 1-4 can be incorporated into or omitted from any embodiment of the presently disclosed technology. Similar, any features described with respect to one embodiment can be incorporated into or omitted from any embodiment of the presently disclosed technology.

The following exemplary embodiments further describe optional aspects of the presently disclosed technology and are part of this Detailed Description. These exemplary embodiments are set forth in a format substantially akin to claims, although they are not technically claims of the present application. The following exemplary embodiments refer to each other in dependent relationships as "embodiments" instead of "claims."

1A. A foldable booklet configured to hold and protect a golf scorecard therein, the foldable device comprising:

an outer jacket foldable about a seam, binding, or hinge, the outer jacket movable between a closed position and an open position, the outer jacket including an interior surface and an opposing exterior surface, at least a portion of the interior surface being configured to contact a scorecard placed within the outer jacket, when in the open position the outer periphery of the outer jacket being at least slightly larger than an outer periphery of the scorecard configured to be held within the outer jacket; and a flexible shield attached to either i) a top edge of the outer jacket or ii) the seam, binding, or hinge, the shield being at least partially transparent or translucent, the shield being moveable between a closed position and an open position, the shield being configured to prevent liquid from contacting an interior surface of the outer jacket or limiting the amount of liquid that can contact the interior surface of the outer jacket.

2A. The foldable booklet of embodiment 1A, wherein the flexible shield is translucent or transparent.

1B. A method for reducing the amount of rainwater that contacts a golf scorecard when playing golf in the rain, the method comprises attaching an interior cover to a scorecard holder, wherein at least a portion of the interior cover is movable with respect to an outer jacket of the scorecard holder to provide access to the scorecard without exposing the scorecard to rain.

2B. The method of embodiment 1B, wherein the interior cover is translucent or transparent.

3B. The method of embodiment 1A or 1B, wherein a width and length of the interior cover are greater than a width and length of the outer jacket, respectively, when the outer jacket is in an open position and the interior cover is in a closed position.

1C. A scorecard holder comprising:

an outer jacket including an interior surface and an opposing exterior surface, at least a portion of the interior surface being configured to contact the scorecard placed within the outer jacket, an outer periphery of the outer jacket being at least slightly larger than the outer periphery of the scorecard configured to be held by the outer jacket; and a flexible shield attached to a top edge of the outer jacket, the shield being at least partially transparent or translucent, the shield being moveable between a closed position and an open position, in the closed position the shield being configured to contact the scorecard or the interior surface of the outer jacket, in the open position the shield being movable to allow a user to access and write on the scorecard.

1D. A scorecard holder comprising:

an outer jacket foldable about a seam, binding, or hinge, the outer jacket movable between a closed position and an open position, in the closed position the holder being configured to surround the scorecard, in the open position the holder being configured to expose at least a portion of the scorecard, the outer jacket including an interior surface and an opposing exterior surface, at least a portion of the interior surface being configured to contact the scorecard placed within the outer jacket, when in the open position an outer periphery of the outer jacket being at least slightly larger than the outer periphery of the scorecard configured to be held within the outer jacket; and a flexible shield attached to the seam, binding, or hinge, the shield being at least partially transparent or translucent, the shield being moveable between a closed position and an open position, in the closed position the shield being configured to contact the scorecard or the interior surface of the outer jacket, in the open position the shield being movable to allow a user to access and write on the scorecard.

While the presently disclosed technology has been described in detail and with reference to specific examples thereof, it will be apparent to one skilled in the art that various changes and modifications can be made therein without departing from the spirit and scope thereof. It is understood, therefore, that the presently disclosed technology is not limited to the particular embodiments disclosed, but it is intended to cover modifications within the spirit and scope of the presently disclosed technology as defined by the appended claims.

What is claimed is:

1. A golf scorecard holder comprising:

an outer jacket foldable about a seam, binding, or hinge, the outer jacket movable between a closed outer jacket position and an open outer jacket position, in the closed outer jacket position the golf scorecard holder being configured to surround a golf scorecard, in the open outer jacket position the golf scorecard holder being configured to expose at least a front surface of the golf scorecard, the outer jacket including an interior surface and an opposing exterior surface, at least a portion of the interior surface being configured to contact the golf scorecard placed within the outer jacket, when in the open outer jacket position an outer periphery of the outer jacket being larger than an outer periphery of the scorecard configured to be held within the outer jacket; and at least one flexible shield attached to the outer jacket, the at least one flexible shield being at least partially transparent or translucent, the at least one flexible shield being moveable between a closed shield position and an open shield position, in the closed shield position the shield being configured to contact the golf scorecard or the interior surface of the outer jacket, in the open outer jacket position the shield being movable to allow a user to access and write on the golf scorecard, wherein in the closed shield position the at least one flexible shield is larger than the outer jacket when the outer jacket is in the open outer jacket position.

2. The golf scorecard holder of claim 1, wherein the at least one flexible shield is configured to prevent liquid from contacting the golf scorecard or the interior surface of the outer jacket when the shield is in the closed shield position.

3. The golf scorecard holder of claim 2, wherein a top edge of the outer jacket extends perpendicularly to the seam, binding, or hinge.

4. The golf scorecard holder of claim 1, wherein a clip is attached to a bottom edge of the outer jacket, the clip being movable and being configured to hold the at least one flexible shield against the scorecard or the interior surface of the outer jacket.

5. A golf scorecard holder comprising:

an outer jacket foldable about a seam, binding, or hinge, the outer jacket movable between a closed outer jacket position and an open outer jacket position, in the closed outer jacket position the golf scorecard holder being configured to surround a golf scorecard, in the open outer jacket position the golf scorecard holder being configured to expose at least a front surface of the golf scorecard, the outer jacket including an interior surface and an opposing exterior surface, at least a portion of the interior surface being configured to contact the golf scorecard placed within the outer jacket, when in the open outer jacket position an outer periphery of the outer jacket being larger than an outer periphery of the scorecard configured to be held within the outer jacket; and at least one flexible shield attached to the outer jacket, the at least one flexible shield being at least partially transparent or translucent, the at least one flexible shield being moveable between a closed shield position and an open shield position, in the closed shield position the shield being configured to contact the golf scorecard or the interior surface of the outer jacket, in the open outer jacket position the shield being movable to allow a user to access and write on the golf scorecard, wherein the at least one flexible shield includes a single inner shield and two spaced-apart outer shields.

6. The golf scorecard holder of claim 5, wherein a surface area of the single inner shield is larger than a surface area of both of the outer shields combined.

7. The golf scorecard holder of claim 6, wherein the single inner shield is positioned between the interior surface of the outer jacket and both of the outer shields.

* * * * *